United States Patent [19]
Dinkjian

[11] Patent Number: 6,006,316
[45] Date of Patent: *Dec. 21, 1999

[54] PERFORMING SIMD SHIFT AND ARITHMETIC OPERATION IN NON-SIMD ARCHITECTURE BY OPERATION ON PACKED DATA OF SUB-OPERANDS AND CARRY OVER-CORRECTION

[75] Inventor: Robert Michael Dinkjian, Colchester, Vt.

[73] Assignee: International Business Machines, Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/770,349

[22] Filed: Dec. 20, 1996

[51] Int. Cl.$^6$ .................................................. G06F 9/302
[52] U.S. Cl. .......................... 712/22; 708/524; 712/221; 712/223; 712/224
[58] Field of Search ........................ 364/736.04; 395/562, 395/564, 565, 800.09, 800.22; 708/524; 712/221, 223, 224, 22

[56] References Cited

U.S. PATENT DOCUMENTS

| | | | |
|---|---|---|---|
| 4,139,899 | 2/1979 | Tulpule et al. | 712/224 |
| 5,276,634 | 1/1994 | Suzuki et al. | 708/497 |
| 5,408,670 | 4/1995 | Davies | 712/16 |
| 5,418,915 | 5/1995 | Matuda et al. | 712/22 |
| 5,627,966 | 5/1997 | Hanko | 714/49 |
| 5,666,298 | 9/1997 | Peleg et al. | 708/209 |
| 5,689,592 | 11/1997 | Ericsson et al. | 382/304 |

FOREIGN PATENT DOCUMENTS

| | | |
|---|---|---|
| 661624 | 12/1994 | European Pat. Off. . |
| WO 95/17712 | 6/1995 | WIPO . |

*Primary Examiner*—Kenneth S. Kim
*Attorney, Agent, or Firm*—Schmeiser, Olsen & Watts; Eugene I. Shkurko

[57] ABSTRACT

A microprocessor circuit is disclosed for instructions on an arithmetic/shift function performing standard operations (e.g., ALU instructions or Shift instructions) on instructions in a first cycle of operation, and a correction circuit responsive to the arithmetic/shift function for modifying the standard results provided by the arithmetic/shift function to results required by a SIMD instruction being executed. The arithmetic/shift function is an instruction provided by either an Arithmetic Logic Unit (ALU) or by a shift instruction. The correction circuit passes data, unchanged for logical instructions but provides condition codes according to the SIMD instruction.

19 Claims, 8 Drawing Sheets

PERFORMING SIMD SHIFT AND ARITHMETIC OPERATION IN NON-SIMD ARCHITECTURE BY OPERATION ON PACKED DATA OF SUB-OPERANDS AND CARRY OVER-CORRECTION

BACKGROUND OF THE INVENTION

1. Field of the Invention

This invention relates generally to data registers in microprocessor circuitry and more particularly to a Single Instruction Multiple Data (SIMD) correction circuit for modifying the results of an arithmetic/shift operation.

2. Description of Related Art

Heretofore, logic circuits have been proposed to improve performance of arithmetic/shift operations in data processing. With the increasing need for processing large amounts of data at ever increasing speed, improved efficiency of arithmetic/shift operations is very important. In particular, one of the difficulties of Multi-media, especially relating to graphics, is the large number of data that must be processed. An attribute of the Single Instruction Multiple Data (SIMD) is that each SIMD instruction can perform an operation on each 8 bit, 16 bit, 32 bit, or 64 bit field of a 64 bit operand independently.

A SIMD ADD, for example, would perform an add on the first, second, third and fourth 16 bit section of the register operands as if the SIMD ADD were 4 independent 16 bit add instructions. A SIMD SHIFT, for example, would perform a shift on the first, second, third, and fourth 16 bit section of the register operands as if the SIMD SHIFT were 4 independent 16 bit SHIFT instructions. Also, the SHIFT operations include shift left, shift right logical, shift right arithmetic.

SIMD has gained recent popularity with the announcement of the Intel MMX Extension. The MMX is a SIMD architecture. Implementing MMX extensions to the X86 architecture costs additional execution units dedicated to the MMX format. Converting a standard execution unit to perform both standard and SIMD operations introduces difficulties that have not heretofor been addressed. First, additional execution units adds delay to critical paths such as carry propagate paths since in SIMD the carry between SIMD sub-operands (16 bit or 32 bit sections) must be suppressed. Second, additional execution units requires additional silicon real estate (area). Third, additional execution units increases the development time and cost because the execution units are highly specialized circuits.

SUMMARY OF THE INVENTION

This invention includes a correction circuit to convert a standard logic execution unit to perform both standard operations and SIMD operations. This invention has the advantages of alleviating the difficulty of delay to critical paths such as carry propagate paths; requiring less silicon space than if additional execution units were added; and does not require developing further highly specialized execution units. Execution units are highly specialized and thus to make a change to one is very labor intensive. This invention improves the performance of processing large amounts of data in applications such as Multi-media and signal processing. This invention eliminates the critical paths, because logic is not added in the critical paths; saves time and silicon real estate because the same execution unit is being reused; and does not require the restructuring of a complex unit with added logic therein. Another operation that requires processing large amounts of data which has application in both Multi-media and signal processing is matrix multiply. The present invention may be used on the standard logic of arithmetic/shift operations (e.g., ADD, SUBTRACT, DIVIDE, MULTIPLY, SHIFT) of Arithmetic Logic Units (ALUs) and Shift logic.

This invention includes a microprocessor circuit having an execution unit for execution of standard instructions in an arithmetic/shift operation and a correction circuit responsive to the execution unit for modifying the standard instructions provided by the execution unit to results required by a SIMD instruction being executed. This improves efficiency of the operations because the correction circuit modification may be performed in a second cycle and the arithmetic/shift operation is free to execute a second instruction in the second cycle. The arithmetic/shift operation results from an instruction provided by either an Arithmetic Logic Unit (ALU) or by a shift function. The correction circuit passes data, unchanged for standard logical instructions but provides condition codes according to the SIMD instruction. The correction circuit corrects arithmetic operations by operating on standard data based on significant bits and carry bits for sub-unit boundaries.

In the case of a Shift operation, this invention includes a Shifter performing standard operations on instructions in a first cycle of operation, a mask generating circuit in parallel with the Shifter circuit, and a correction circuit responsive to the Shifter and the mask generating circuit for modifying the standard results provided by the Shifter to results required by a SIMD Shift operation being executed. This modification may be performed by an address overlay mask in a second cycle operation and the Shifter is free to execute a second instruction in the second cycle.

BRIEF DESCRIPTION OF THE DRAWINGS

The preferred exemplary embodiment of the present invention will hereinafter be described in conjunction with the appended drawings, where like designations denote like elements, and.

BEST MODE FOR CARRYING OUT THE INVENTION

Figure 1:
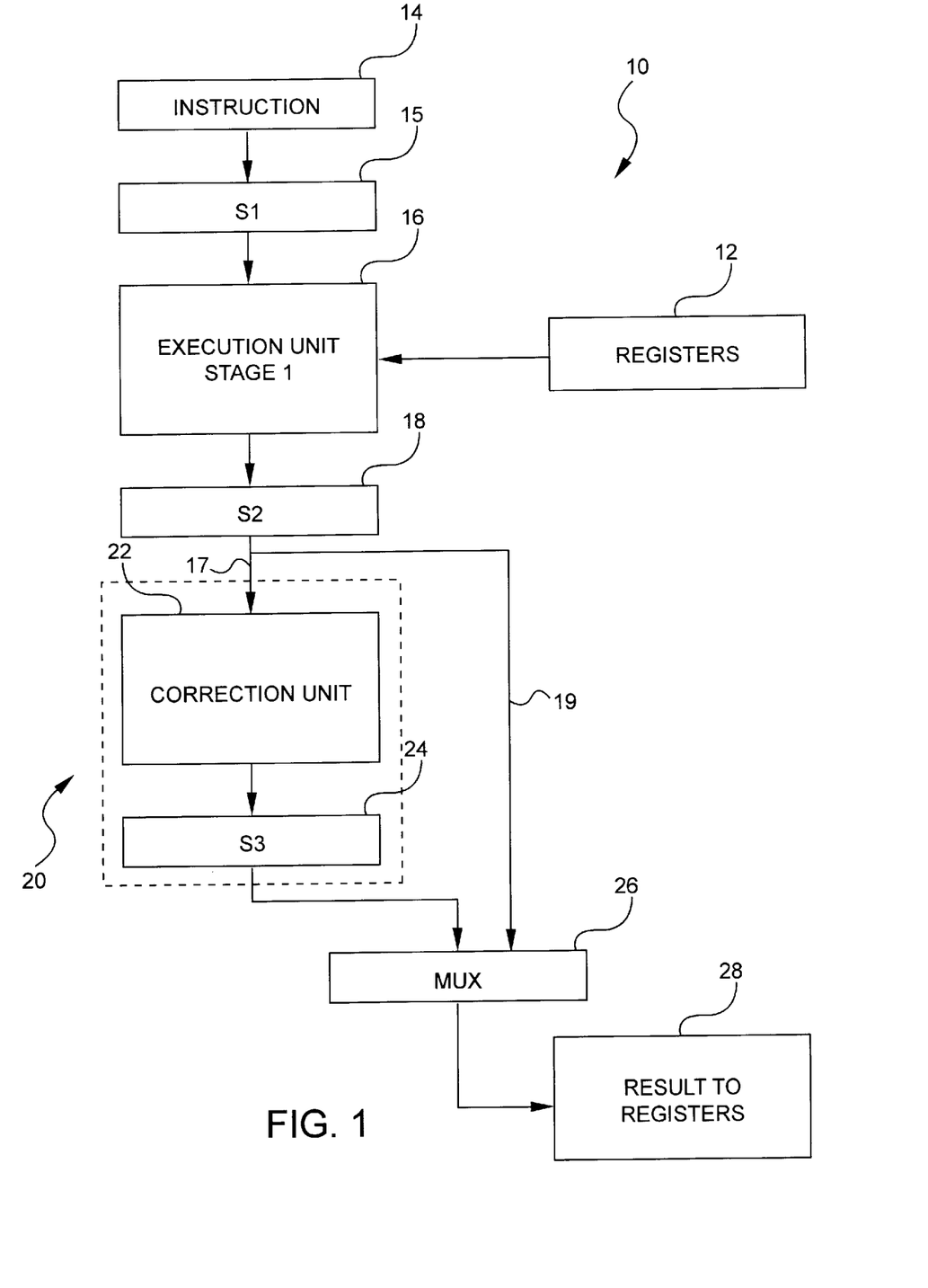
FIG. 1 depicts a block diagram showing an execution unit for performing an arithmetic/shift operation and correction circuit of a first preferred embodiment in accordance with the present invention.

Referring to FIG. 1, a microprocessor circuit 10 of the present invention is shown with a correction circuit 20. The correction circuit 20 modifies the results of either standard operations of an ALU (FIG. 4) or of standard operations of a Shifter (FIGS. 5–7) to results required by a SIMD instruction being executed. Standard execution unit 16 receives an instruction to be executed from a reservation station (s1) 15 which holds the instruction 14 to be executed. The execution unit 16 provides access to registers 12 and performs either an ALU operation or a shifter operation. Finish stage (s2) 18 holds results to be written when the instruction 14 completes in the write-back stage.

A correction circuit 20 is shown including correction unit 22 and finish stage (s3) 24 for SIMD applications. In a first embodiment in FIG. 1, the execution unit is depicted as a two-stage pipeline. The first stage 17 to the pipeline enters the correction circuit 20 and the second stage 19 to the pipeline bypasses the correction circuit 20 to MUX 26 for non-SIMD operations. The results to registers 28 of the two pipelines 17, 19 are provided to the registers 12.

Figure 2:
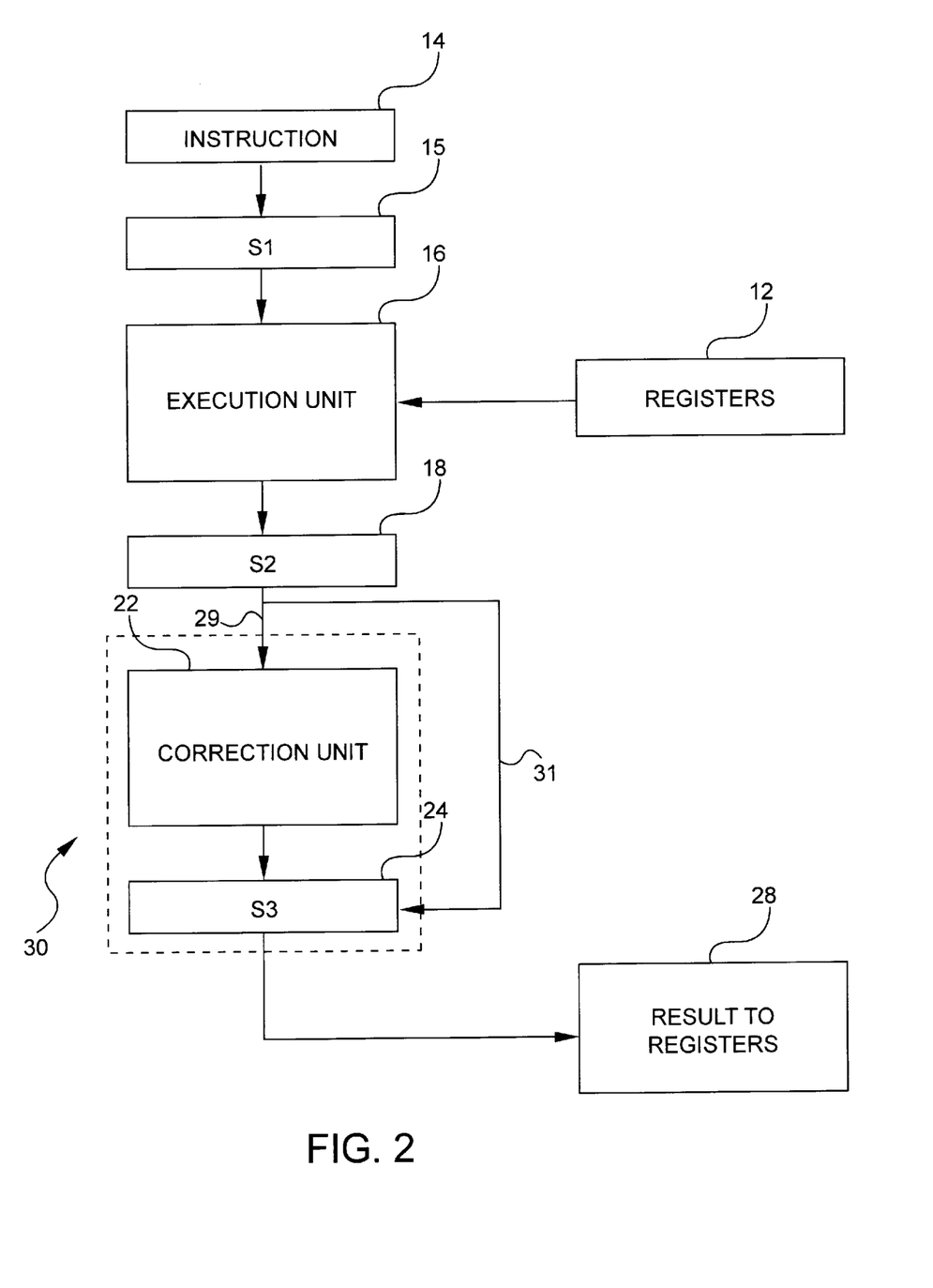
FIG. 2 depicts a block diagram showing an execution unit for performing an arithmetic/shift operation unit and correction circuit of a second preferred embodiment in accordance with the present invention.

FIG. 2 depicts a correction circuit 30 of a second embodiment of the present invention. This embodiment is similar to FIG. 1 except that the MUX 26 is eliminated, permitting a SIMD or correction operation in the same cycle as a non-SIMD operation. A SIMD correction instruction is passed through flow line 29 and a non-SIMD instruction bypasses the correction unit 22 through flow line 31.

Figure 8:
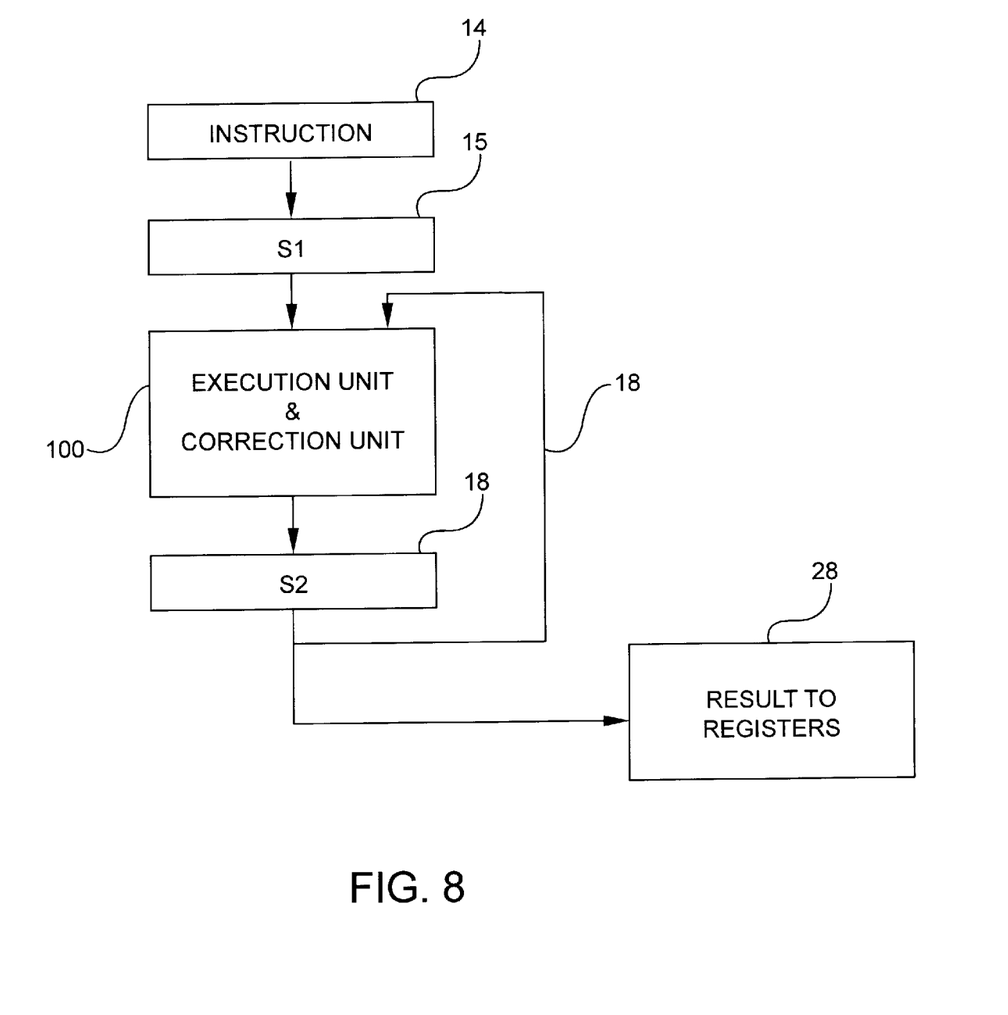
FIG. 8 depicts a block diagram showing an execution unit/correction unit for a third preferred embodiment in accordance with the present invention.

In yet another implementation FIG. 8 shows a combined execution unit/correction unit 100. The correction stage could be performed by the ALU or shift operator of the execution unit/correction unit 100 by feeding the result 17, 101 of the first pass of the ALU or shift operator stage back to the ALU or shift operator with appropriate control hardware added. All of these implementations become obvious to one skilled in the art when taught the present invention and are therefore claimed by this disclosure.

SIMD Implementation Using Standard ALU

Figure 3:
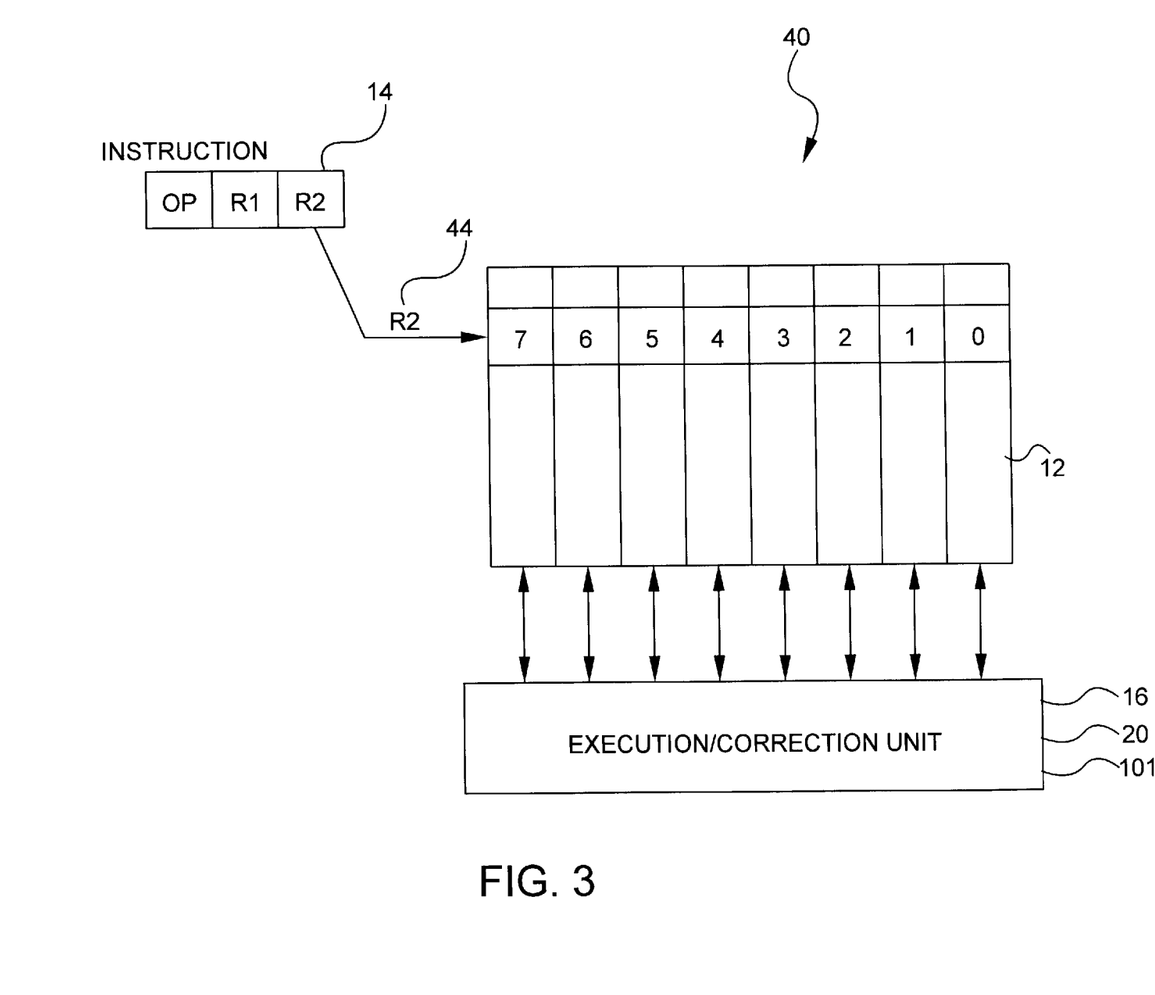
FIG. 3 depicts a high level view of a SIMD operation in accordance with a preferred embodiment of the present invention.

FIG. 3 shows a high level view of a SIMD operation 40. An instruction 14 is depicted. A single SIMD instruction 44 performs operations simultaneously on subsets 7, 6, 5, 4, 3, 2, 1, 0 of the registers 12. As shown, Register operand (R2) 44 points to a 64 bit register 12. The operand instruction OP specifies the operation, for example, R1<-R1+R2 ADD instruction. The instruction 14 will perform independent adds on each subset 7 through 0. Each subset 7 through 0 could be a single byte such that 8 independent adds are performed by the instruction using each of the 8 bytes in the 64 bit register operand, or the subset could be 16 or 32 bits.

Figure 4:
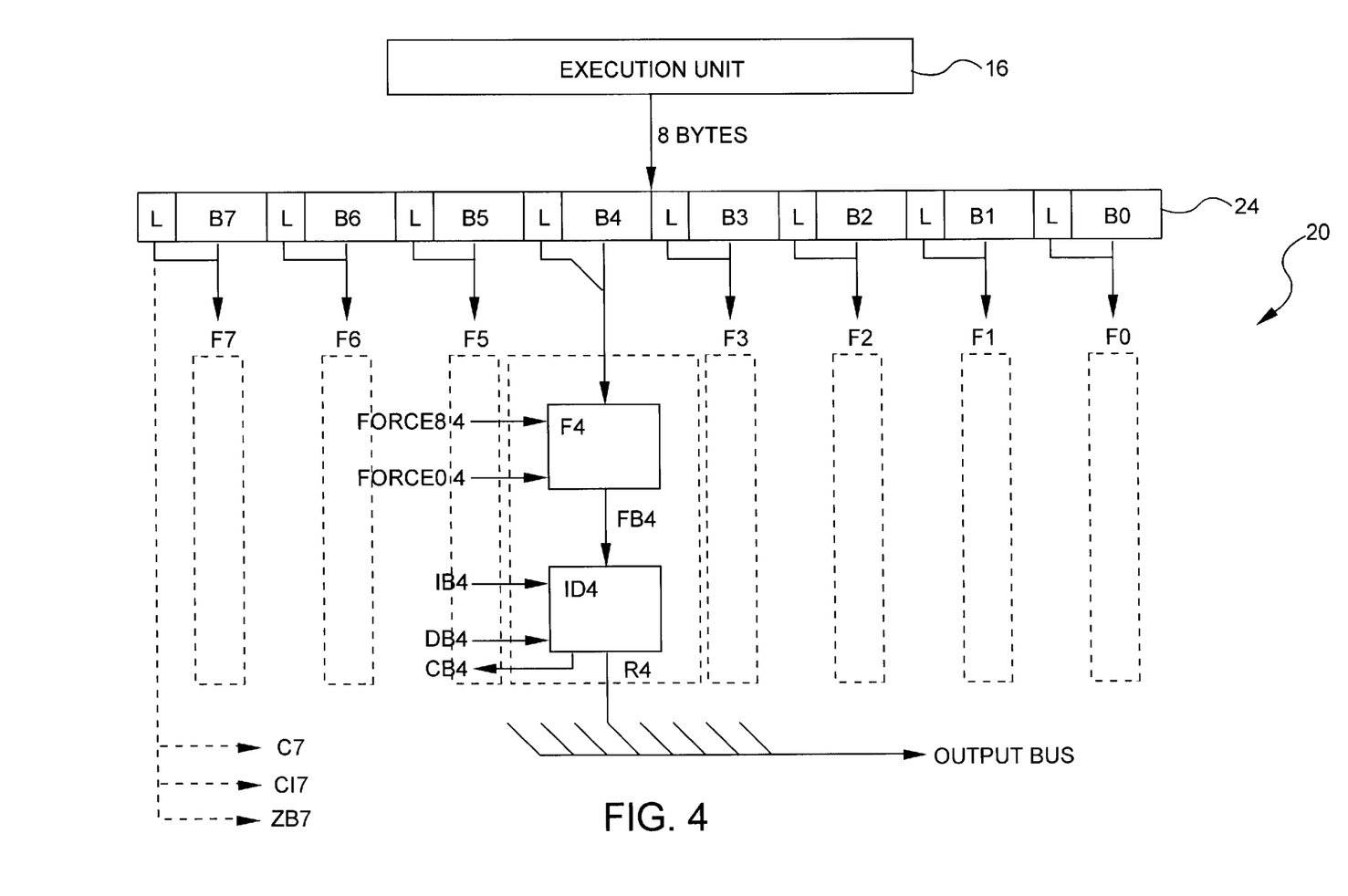
FIG. 4 depicts a flow diagram disclosing a correction unit detail in accordance with a preferred embodiment of the present invention.

Refering to FIG. 4, the detail of the correction unit 20 of FIGS. 1 and 2 are depicted for use with a standard ALU. A 64 bit execution unit 16 has an eight byte result register 24. B7 is the high order byte, B(6), ... with B(0) being the low order byte. Each of these bytes has three additional latches C(n), CI(n), and ZB(n). C(n) is the carry out of the high order bit of B(n) (the carry out of the byte), CI(n) is the carry into the high order bit of B(n), and ZB(n) indicates that all bits of B(n) are zero.

Each of these B(n) registers is connected to a box labeled F(n), the force box. F(n) has two input control lines plus the data from B(n). The input control lines are Force 8(n) and Force 0(n). Force 8(n) forces hex '80' on the output FB(n) of this box while Force 0(n) forces hex '00'. If both control lines are off then the input bus is passed to the output bus unmodified. The FB(n) byte output goes to a increment/ decrement box ID(n). This box has two control inputs IB(n) and DB(n). IB(n) increments the input bus by one and DB(n) decrements the input bus by one. Both control lines being off passes the input bus to the output bus R(n) unmodified. ID(n) thus has a byte output bus and a output control line CB(n). This output is the CARRY/BORROW NOT line for the byte increment/decrement. That is, it should be active when DB(n) is active and FB(n)=X'00', or when IB(n) is active and FB(n)=X'FF'.

The following explain examples of the operations to be performed. While all combinations of these functions are not possible in the current SIMD definition the present invention contemplates all possibilities.

A number of instruction parameters are provided during the correction stage. First, Byte(B), Word(W), Double word (DW), and Quadword(QW) data size (where a word is 16 bits) is provided. Second, an ADD or SUBTRACT instruction is provided. Third the instruction may be in signed or unsigned format. Signed numbers are standard two's complement format, while unsigned assumes only positive numbers. Fourth, these instructions are performed with either saturation or without. Without saturation means that results wrap if they exceed the specified size. With saturation means that if the results exceed the size then the largest or smallest number possible given the format is inserted. For example, in the case of an unsigned byte an overflow produces a result of 255 or hex 'FF' while an underflow (for subtract only) produces a result of 0 or hex '00'. For signed byte an overflow produces a result of 127 or X'7F' while an under flow (possible with add and subtract) produces a result of −128 or hex '80'. The structure defined in FIGS. 1–4 allow for implementation of correction for all combinations of the above instruction parameter scenarios. Note that while the F-box produces the X'00' and X'80' directly the constants X'FF' and X'7F' are produced indirectly taking the X'00' and X'80' and decrementing by one.

In the simplest scenario ADD UNSIGNED BYTE (no saturation). The low order byte B(0) needs no correction. The next byte B(1) needs to be decremented by one if C(0)=1. Thus DB(1)=C(0). In general B(n) needs to be decremented by one if C(n-1)=1 or DB(n)=C(n-1).

For the ADD UNSIGNED WORD (no saturation) scenario, the result B(1)/B(0) needs no correction. The next word B(3)/B(2) needs to be decremented by one if C(1)=1. This means that DB(2)=C(1) and that DB(3)=CB(2). In general then DB(n)=C(n-1) and DB(n+1)=CB(n) where n=2, 4, 6.

ADD UNSIGNED DOUBLE WORD follows a similar pattern while ADD UNSIGNED QUADWORD needs no correction. It should also be obvious that the above pattern is identical for ADD SIGNED (no saturation).

In ADD UNSIGNED BYTE WITH SATURATION only overflow is possible, so only forcing X'FF' is required. The low order byte B(0) needs no decrementing but if C(0)=1 then X'FF' should be forced. This is done by setting F0(0)=1 and DB(0)=1. Thus F0(0)=C(0) and DB(0)=C(0). The next byte B(1) needs to be decremented if C(0)=1 and needs to be forced to X'FF' if C(1)=1. Thus F0(1)=C(1) and DB(1)=C (0) OR C(1). Note that it is acceptable to force X'FF' in the case where C(1)=1 was caused by C(0)=1 because the result ignoring C(0) must have been X'FF' anyway. So in general F0(n)=C(n) and DB(n)=C(n) OR C(n-1).

With regard to ADD UNSIGNED WORD WITH SATURATION, the low order word B(1)/B(0) does not need to be decremented but if C(1)=1 then both bytes need to be forced to X'FF'. Thus DB(1)=DB(0)=FO(0)=FO(1)=C(1). The next word B(3)/B(2) needs to be decremented if C(1)=1 and forced to X'FFFF' if C(3)=1. For B(2) then DB(2)=C(3) OR C(1) and FO(2)=C(3). For B(3) then FO(3)=C(3) and DB(3)=C(3) OR CB(2). In general FO(n+1)=FO(n)=C(n+1) and DB(n)=C(n+1) OR C(n−1) and DB(n+1)=C(n+1) OR CB(n) where n=2, 4, 6.

ADD UNSIGNED DW/QW WITH SATURATION follows a similar pattern.

In unsigned addition C(n) represents overflow, while under flow could not happen. In signed addition underflow and overflow are possible so it is more complicated. Let OV(n)=C(n) AND NOT CI(n) represent overflow, while UV(n)=C(n) AND NOT CI(n) represent underflow and V(n)=UV(n) OR OV(n) represent some overflow/underflow condition.

ADD SIGNED BYTE WITH SATURATION requires forcing X'7F' or X'80'. The low order byte B(0) needs no decrementing but if OV(0)=1 then B(0)needs to be forced to X'7F' while if UV(0)=1 then B(0) needs to be forced to X'80'. Thus and X'7F' if OV(1)=1. Thus F8(1)=V(1) and DB(1)=OV(1) OR C(0). In general F8(n)=V(n) and DB(n)= OV(n) OR C(n−1).

ADD SIGNED WORD WITH SATURATION adds complication. When detecting underflow or overflow the word must be forced to X'8000' and X'7FFF' respectively. Thus the low order byte must be forced to X'00' and X'FF' while the high order byte must be forced to X'80' and X'7F'. The low order word B(1)/B(0) does not need to be decremented but if OV(1)=1 then B(1)/B(0) needs to be forced to X'7FFF' and if UV(1)=1 then B(1)/B(0) needs to be forced to X'8000'. Thus F8(1)=F0(0)=V(1), DB(0)=DB(1)=OV(1). The next word B3/B2 must be decremented if C(1)=1, forced to X'7FFF' if OV(3)=1, and forced to X'8000' if UV(3)=1. Thus F8(3)=F0(2)=V(3), DB(2)=OV(3) OR C(1) and DB(3)=OV(3) OR DB(2). In general F8(n+1)=F0(n)= V(n+1), DB(n)=OV(n+1) OR C(n), and DB(n+1)=OV(n+1) OR DB(n) for n=2, 4, 6.

ADD SIGNED DW/QW WITH SATURATION follows a similar pattern. The SUBTRACT scenarios are the same as ADD except that instead of the correction being decremented by one when carry in is one, it is incremented by one when carry in is zero (borrow is one). Underflow and overflow are defined the same.

COMPARE FOR EQUAL and COMPARE FOR GREATER THAN take two operands in the signed B, W, DW, or QW length and perform a compare. The result field is set to all ones if true and all zeros if false. Given the ZB(n), C(n), and CI(n) signals it is trivial to determine if the Byte, Word, Double word, or Quadword is EQUAL or GREATER THAN. The structure defined already permits forcing all zeroes and all ones.

In surnmary, after the 64 bit addition occurs, the result is broken up into individual bytes B(0)–B(7) and stored in register 24, and each byte receives three additional bits C(n), CI(n) and ZB(n). C(n) is the carry out of the high order bit of B(n), CI is the carry into of the high order bit of B(n), and ZB(n) indicates that all of the bits of B(n) is zero. After these values are collected in register 24, each byte is passed to a correction circuit comprised of a "force box" F(n) and then an "increment/decrement box" ID(n).

The force box F(n) will either: (1) force the output to a value of hex 80; (2) force the output to a value of hex 00; or pass the value stored in B(n) unchanged. The output value will be forced to hex 80 if F8(n)=1, or will be forced to hex 00 if F0(n)=1. The force box will only be utilized if the operation includes saturation. The logic for determining the values of F8(n) and F0(n) is described above and summarized in the table below (assume saturation).

| Operation | F8 | F0 |
|---|---|---|
| Add Unsigned Byte | * | F0(n) = C(n) |
| Add Unsigned Word | * | F0(n) = F0(n + 1) = C(n + 1) where n = 2, 4, 6 . . . |
| Add Signed Byte | F8(n) = V(n) | * |
| Add Signed Word | F8(n) = F8(n + 1) = V(n + 1) Where n = 2, 4, 6 . . . | * |

The increment/decrement box takes the result of the force box and increment the result when IB(n)=1 and decrement the result when DB(n)=1. The values are logically determined as follows.

| Operation | IB(n) | DB(n) |
|---|---|---|
| Add Unsigned Byte (No Sat) | * | DB(n) = C(n − 1) |
| Add Unsigned Word (No Sat) | * | DB(n) = C(n − 1), DB(n + 1) = CB(n) where n = 2, 4, 6 . . . |
| Add Unsigned Byte (Sat) | * | DB(n) = C(n) OR C(n − 1) |
| Add Unsigned Word (Sat) | * | DB(n) = C(n + 1) OR C(n − 1); and DB(n + 1) = C(n + 1) OR CB(n) where n = 2, 4, 6 . . . |
| Add Signed Byte (Sat) | * | DB(n) = OV(n) OR C(n − 1) |
| Add Signed Word (Sat) | * | DB(n) = OV(n + 1) OR C(n) DB(n + 1) = OV(n + 1) OR DB(n) where n = 2, 4, 6 . . . | note:
V(n) = (C(n) AND NOT CI(n)) OR (C(n) AND NOT CI(n))
CB(n) = ((DB(n) = 1 AND FB(n) = 0) OR (IB(n) = 1 AND FB(n) = FF)
OV(n) = C(n) AND NOT CI(n)

Accordingly, the correction circuit for each type of add can be readily implemented by standard logic circuits using the above equations.

Referring to FIG. 4, the carry logic can be generated in many ways known in the art. The figure implies a "ripple" arrangement but carry predict and carry look-ahead techniques (for instance) may be used within the scope of the invention.

SIMD Shift Instruction with Standard Shifter

As shown in FIG. 1 a reservation station (s1) 15 which holds the instruction to be executed, an execution unit 16 includes a SHIFTER (FIG. 5), access to registers 12, and a finish stage (s2) 18 which holds results to be written when the instruction completes in the write-back stage. FIG. 2 shows the present embodiment of the invention where the execution unit 16 is a two stage pipeline and SIMD correction is bypassed for non-SIMD instructions. This embodiment is more fully described above. The SIMD stage takes the result of the Shifter operation and corrects the sub-units to conform with the SIMD operation.

In another implementation of the invention the MUX 26 could be eliminated, permitting a SIMD instruction to complete in the same cycle as a single cycle instruction following it.

In yet another implementation of the present invention the correction stage 20 could be performed by the Shifter stage by feeding the result of the first pass of the Shifter stage back to the Shifter with appropriate control hardware added. All of these implementations become obvious to one skilled in the the art when taught the present invention and are therefore encompassed by this disclosure.

FIG. 3 shows the concept of the SIMD operation, a single SIMD instruction performs operations simultaneously on subsets of the register operands. Register (R2) 44 points to a 64 bit operand 12. The OP code specifies the operation (R1<-R2 SHIFT instruction for instance). The SIMD instruction will perform independent SHIFTS on each subset. The subset could be a single byte such that 8 independent SHIFTS are performed by the instruction using each of the 8 bytes in the 64 bit register operand, or the subset could be 16 or 32 bits.

Figure 5:
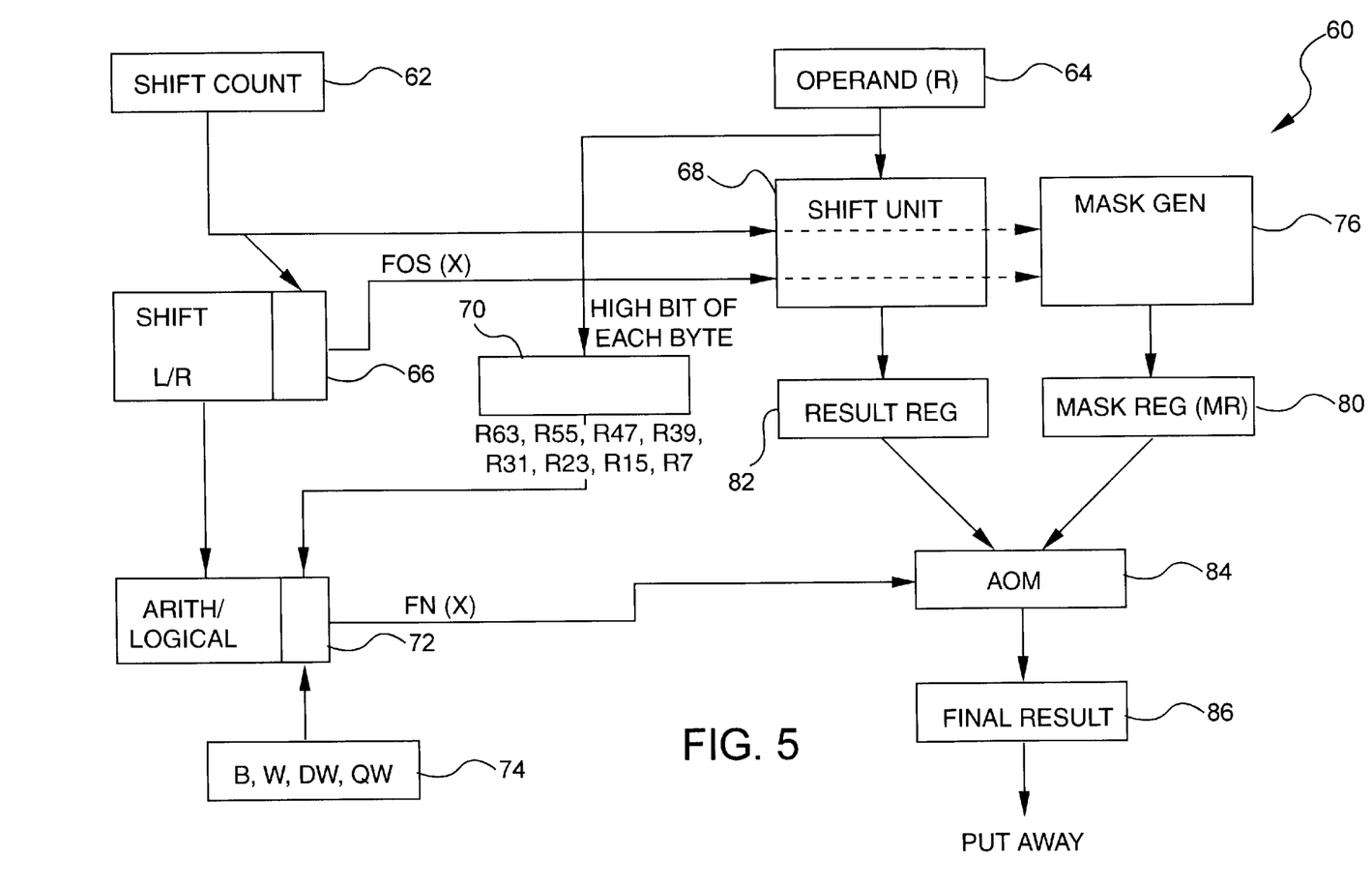
FIG. 5 depicts a flow diagram of a shift function in accordance with a preferred embodiment of the present invention.

FIG. 5 shows a high level view of a Shifter stage 60 of a preferred embodiment of the present invention. The Shift Count (SCNT) 62, Operand 64 and Result regs 82 are part of the standard Shift Unit function for Non-SIMD instructions. A Mask Generator 76 uses the Operand 64 and Shift Count 62 to generate a Mask Reg (MR) 80 for the AND-OR Mask (AOM) 84 in parallel with the standard shift result. The Mask generator, MR, and AOM are the correction circuit as depicteu in FIGS. 1 and 2. The result of the AOM 84 is latched in the final result (second stage) register.

Figure 6:
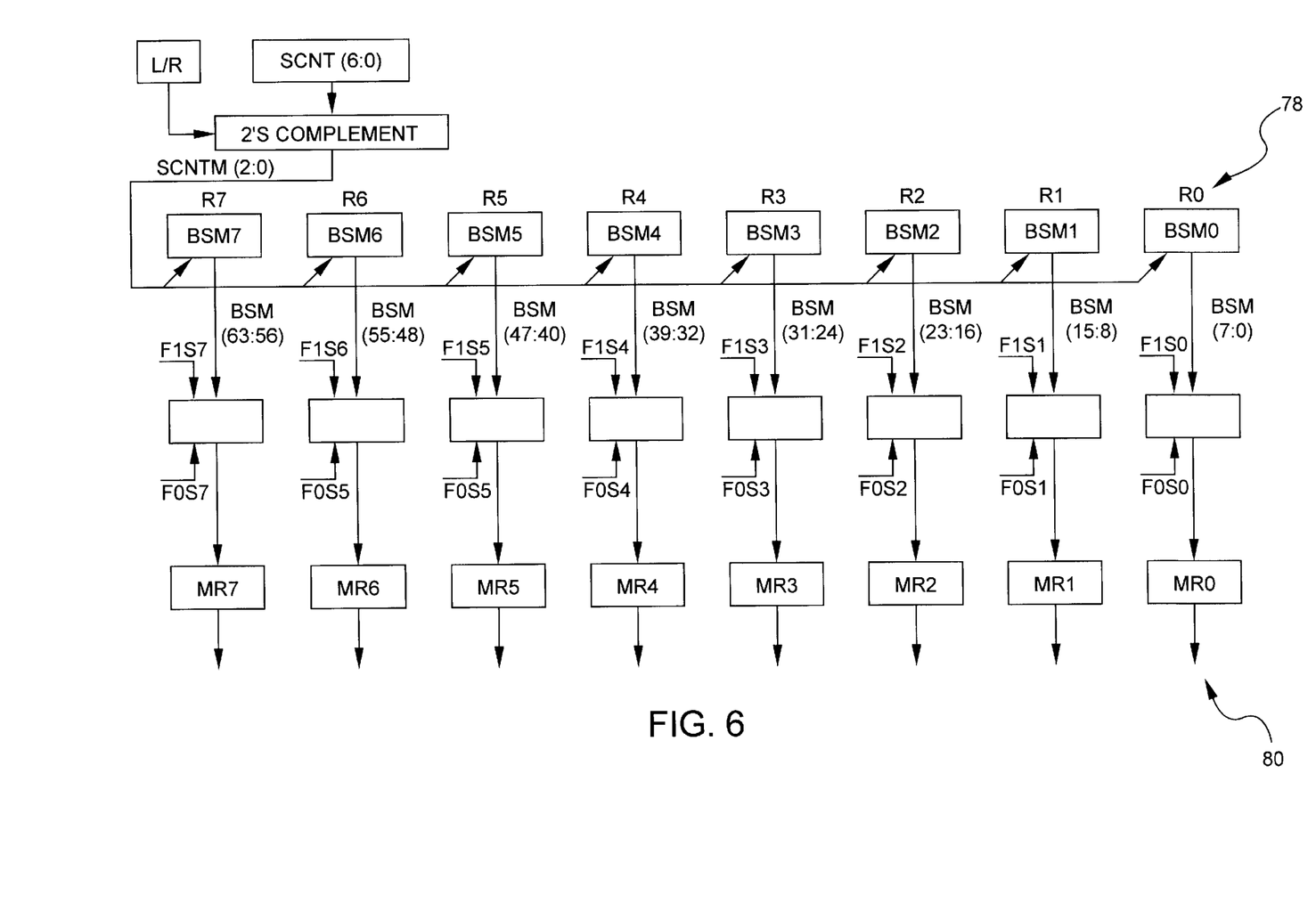
FIG. 6 depicts mask generator detail in accordance with the present invention as depicted in FIG. 5.

The details of the Mask Generator 76 are shown in FIG. 6. The Left or Right shift indicator (L/R) 66 in conjunction with the Shift Count Register (SCNT) 62 creates a Shift Count Mask (SCNTM) 62. The Byte Shift Mask (BSM) 78 generates the shift mask for each byte of

TABLE 1

Byte Shift Mask (BSM) Function

| SCNTM | BSM (7:0) |
|---|---|
| 2 1 0 | 7 6 5 4 3 2 1 0 |
| 0 0 0 | 1 1 1 1 1 1 1 1 |
| 0 0 1 | 1 1 1 1 1 1 1 0 |
| 0 1 0 | 1 1 1 1 1 1 0 0 |
| 1 0 0 | 1 1 1 1 0 0 0 0 |
| 1 0 1 | 1 1 1 0 0 0 0 0 |
| 1 1 0 | 1 1 0 0 0 0 0 0 |
| 1 1 1 | 1 0 0 0 0 0 0 0 | the 64 bit mask. This mask would be correct if it was a byte left shift with a count less than eight. ANDing the mask with the data produces the proper result for a shift left. Table 2 desrcibes the equations for deriving when the shift count is greater than or equal to a certain number. For example SCT8 is the equation for SCNT greater than or equal to 8. They are used in Table 3 to define the force X'00' (F0Sn) function for shift left and the force x'ff' (F1Sn) function for shift right.

TABLE 2

Shift Count Equations

| SCT8 | = | S3 + S4 + S5 + S6 |
| SCT16 | = | S4 + S5 + S6 |
| SCT24 | = | S5 + S6 + (S3 A S4) |
| SCT32 | = | S5 + S6 |
| SCT40 | = | S6 + S5 A (S3 + S4) |
| SCT48 | = | S6 + (S5 A S4) |
| SCT56 | = | S5 A S4 A S3 |
| SCT64 | = | S6 |

S(x)=SCNT(bit x); "+"=logical OR; "A"=logical AND.

TABLE 3

SHIFT LEFT AND SHIFT RIGHT

| | LEFT RIGHT | FOS7 F1S7 | FOS6 F1S5 | FOS5 F1S5 | FOS4 F1S4 | FOS3 F1S3 | FOS2 F1S2 | FOS1 F1S1 | FOS0 F1S1 |
|---|---|---|---|---|---|---|---|---|---|
| BYTE | LEFT | 0 | 0 | 0 | 0 | 0 | 0 | 0 | 0 |
| | RIGHT | 0 | 0 | 0 | 0 | 0 | 0 | 0 | 0 |
| WORD | LEFT | SCT16 | SCT8 | SCT16 | SCT8 | SCT16 | SCT8 | SCT16 | SCT8 |
| | RIGHT | SCT8 | SCT16 | SCT8 | SCT16 | SCT8 | SCT16 | SCT8 | SCT16 |
| DWORD | LEFT | SCT32 | SCT24 | SCT16 | SCT8 | SCT32 | SCT24 | SCT16 | SCT8 |
| | RIGHT | SCT8 | SCT16 | SCT24 | SCT32 | SCT8 | SCT16 | SCT24 | SCT32 |
| QWORD | LEFT | SCT64 | SCT56 | SCT48 | SCT40 | SCT32 | SCT24 | SCT16 | SCT8 |
| | RIGHT | SCT8 | SCT16 | SCT24 | SCT32 | SCT40 | SCT48 | SCT56 | SCT64 |

Figure 7:
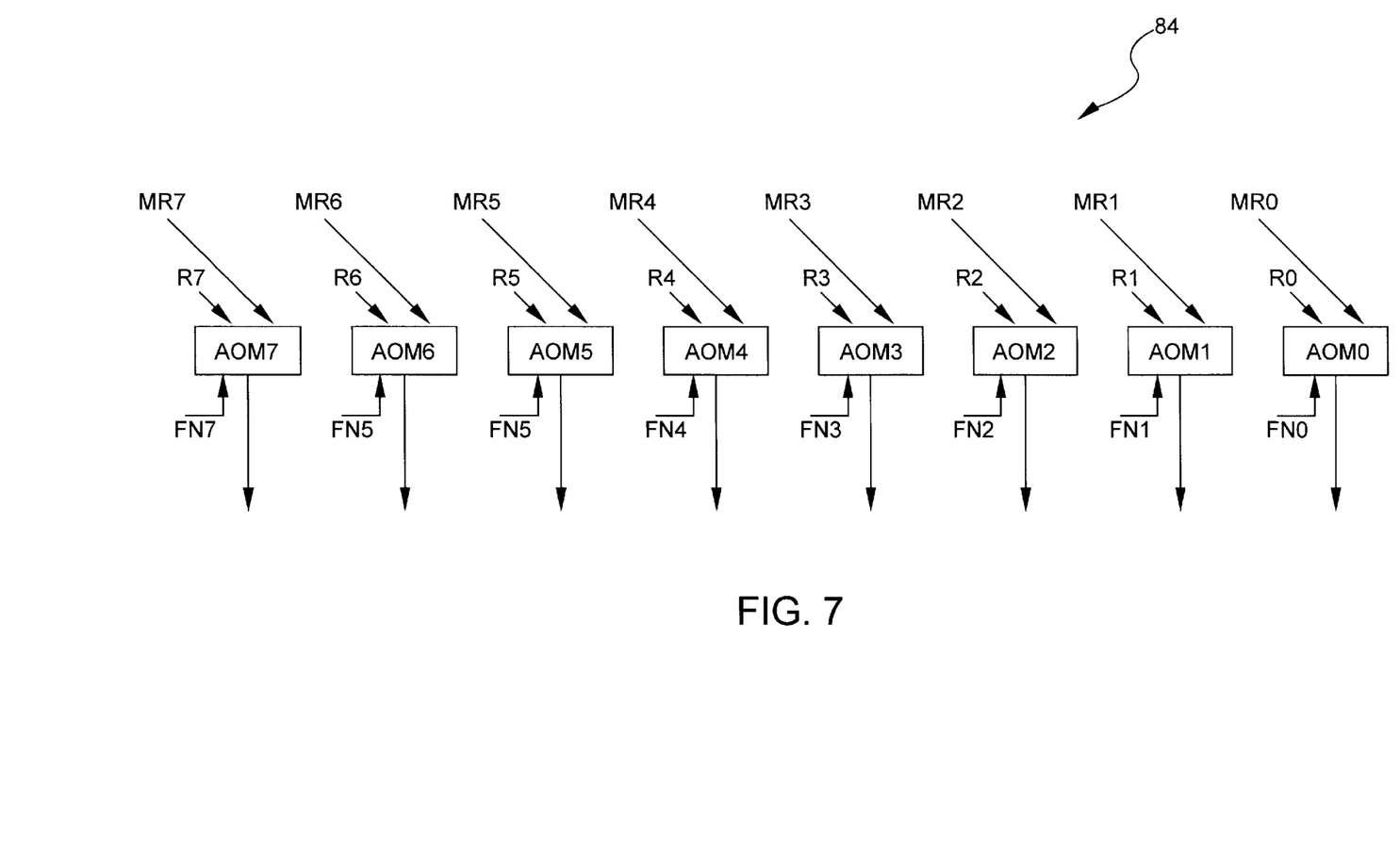
FIG. 7 depicts AND/OR mask (AOM) detail in accordance with the present invention as depicted FIG. 5.

At this point when the mask in the MR is AND/OR red with the 64 bit shifted data in the result register according to the function code defined in FIG. 7 the proper result is generated. The mask generated for shift left has ones where the data should be preserved and zeroes where it should be zeroed out. For shift right zeroes indicate the data should be preserved and ones indicate that zeroes or ones should be padded depending upon the kind of shift (arithmetic or logical) and the appropriate high order bit.

Table 4 shows the Generation of the function field which goes to the AOM. Referring to FIG. 7, the AOM receives the MR and Result register for each byte and perforrns the function indicated in Table 5 based on the FN(X) field.

TABLE 4

FN(X) GENERATION[1]

| Operation: | FN7 | FN6 | FN5 | FN4 | FN3 | FN2 | FN1 | FN0 |
|---|---|---|---|---|---|---|---|---|
| SL (B, W, DW, QW) | 01 | 01 | 01 | 01 | 01 | 01 | 01 | 01 |
| SRL (B, W, DW, QW) | 10 | 10 | 10 | 10 | 10 | 10 | 10 | 10 |
| SRA(B)* | R63 | R55 | R47 | R39 | R31 | R23 | R15 | R7 |
| SRA(W)* | R63 | R63 | R47 | R47 | R31 | R31 | R15 | R15 |
| SRA(DW)* | R63 | R63 | R63 | R63 | R31 | R31 | R31 | R31 |
| SRA(QW)* | R63 | R63 | R63 | R63 | R63 | R63 | R63 | R63 |

[1]SL = SHIFT LEFT
SRL = SHIFT RIGHT LOGICAL
SRA = SHIFT RIGHT ARITHMETIC
B-BYTE
W = 2 BYTES
DW = 4 BYTES
QW = 8 BYTES
*For SRA, the two bit FN code is a "1" concatenated with R(y) where y is a bit position (i.e., R15 is bit 15).

TABLE 5

AOM FUNCTIONS

| FN (1:0) | FUNCTION | DESCRIPTION |
|---|---|---|
| 0 1 | R AND MR | SHIFT LEFT |
| 1 0 | R AND MR$_{not}$ | SHIFT RIGHT W/ ZEROES |
| 1 1 | R OR MR | SHIFT RIGHT W/ ONES |

This invention has been described in terms of specific embodiments, set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

What is claimed is:

1. A microprocessor circuit for performing a single instruction multiple data (SIMD) operation on a SIMD operand, wherein the SIMD operand comprises n sub-operands each comprising an independent set of data, and outputting a SIMD format result comprised of n independent sub-results, the circuit comprising:
   a standard execution unit for receiving the SIMD operand and performing a non-SIMD operation on the SIMD operand during a first cycle and outputting non-SIMD intermediate result, wherein the non-SIMD operation performs a single operation on the SIMD operand in its entirety such that the non-SIMD intermediate result includes n dependent sub-results, each sub-result corresponding to one of the n sub-operands; and
   a correction system for receiving the intermediate result and for modifying the non-SIMD intermediate result to the SIMD format result such that each of the n sub-results is converted from its non-SIMD form into a result that would have occurred had the arithmetic operation been independently performed on its corresponding sub-operand of the SIMD operand.

2. The circuit of claim 1, wherein the correction system modifies the non-SIMD intermediate result during a second cycle.

3. The circuit of claim 1, wherein the standard execution unit is a shifter.

4. The circuit of claim 1, wherein the standard execution unit comprises an arithmetic logic unit (ALU).

5. The circuit of claim 4, wherein the ALU includes an adder circuit.

6. The circuit of claim 4, wherein the correction system comprises:
   a register for storing data containing the non-SIMD intermediate result; and
   a plurality of correction circuits coupled to the register, each correction circuit operating on a portion of the data stored in the register.

7. The circuit of claim 6, wherein each portion of data comprises a subset of the non-SIMD intermediate result and a plurality of carry data, wherein the carry data are calculated during the execution of the non-SIMD operation.

8. The circuit of claim 7, wherein each of the plurality of correction circuits comprises a force circuit that can force the respective subset to at least one predetermined value based upon the carry data.

9. The circuit of claim 8, wherein each of the plurality of correction circuits comprises an increment/decrement circuit that can increment and decrement the output of the force circuit.

10. A microprocessor circuit for executing a Single Instruction Multiple Data (SIMD) arithmetic instruction on SIMD data, the SIMD data having a plurality of data fields, wherein each data field holds an independent value on which an arithmetic operation is to be performed, the circuit comprising:
   a standard execution unit for receiving the SIMD arithmetic instruction, for performing a single arithmetic operation on the SIMD data in its entirety during a first cycle, and for outputting a non-SIMD intermediate result comprising non-independent interrelated data subsets, each data subset corresponding to one of the plurality of data fields of the SIMD data;
   a register for storing the data subsets of the non-SIMD intermediate result, wherein each data subset further includes a set of related carry data calculated during the single arithmetic operation; and
   a correction system, comprising a plurality of correction circuits, wherein each correction circuit operates on a unique one of the data subsets such that each of the data subsets is converted from its non-SIMD form into a result that would have occurred had the arithmetic operation been independently performed on its corresponding data field of the SIMD data, and wherein the correction system outputs a SIMD result comprising independent arithmetic results for each of the plurality of data fields.

11. The circuit of claim 10, wherein the correction system operates during a second cycle.

12. The circuit of claim 10, wherein each correction circuit comprises:

a force circuit that can force the respective data subset to at least one predetermined value based upon the related carry data; and an increment/decrement circuit that can increment and decrement the output of the force circuit based upon the related carry data.

13. The circuit of claim 12, wherein the arithmetic operation is an add operation.

14. The circuit of claim 12, wherein the related carry data comprises:

a bit containing a carry out value of a high order bit of the respective data subset;

a bit containing a carry into value of the high order bit of the respective data subset; and a bit for indicating if all bits of the respective data subset are zero.

15. The circuit of claim 14 wherein each increment/decrement circuit comprises a DB input that indicates that the output of the force circuit should be decremented by the increment/decrement circuit if DB=1, and wherein the DB input for one of the data subsets and for the add unsigned byte operation with no saturation has a value equivalent to the bit containing the carry out value for another of the data subsets, and wherein the DB input for one of the data subsets and for the add unsigned byte operation with saturation has a value equivalent to the bit containing the carry out value for another of the data subsets ORed with the bit containing the carry out value of this one data subset.

16. A microprocessor circuit for executing a Single Instruction Multiple Data (SIMD) shift instruction on a SIMD operand comprised of a plurality of data sub-operands, comprising:

a standard execution unit for receiving the SIMD shift instruction, for performing a non-SIMD shift operation on the SIMD operand during a first cycle, wherein the non-SIMD shift operation shifts the SIMD operand in its entirety, and for outputting a non-SIMD result resulting from the non-SIMD shift operation;

a register for storing the non-SIMD result comprising a plurality of data subsets, each data subset corresponding to one of the plurality of data sub-operands of the SIMD data; and a correction system for converting the non-SIMD result to a SIMD result such that each of the data subsets is converted from its non-SIMD form into a result that would have occurred had the shift operation been independently performed on its corresponding data sub-operand of the SIMD data, wherein the correction system comprises a mask generator and an and-or mask (AOM).

17. The circuit of claim 16, wherein the mask generator generates a data mask comprised of a plurality of bytes, and wherein each byte corresponds to one of the data subsets of the SIMD operand.

18. The circuit of claim 17 wherein each byte of the data mask is a byte shift mask (BSM), each byte shift mask is determined according to a shift count mask (SCNTM), the BSM is FF hexadecimal (h) if the SCNTM is 0, the BSM is FEh if the SCNTM is 1, the BSM is FCh if the SCNTM is 2, the BSM is F0h if the SCNTM is 4, the BSM is E0h if the SCNTM is 5, the BSM is C0 if the SCNTM is 6, and the BSM is 80h if the SCNTM is 7.

19. The circuit of claim 17, wherein the mask generator includes a plurality of force circuits capable of forcing each of the plurality of bytes to a value of either hex FF or hex 00.

* * * * *